United States Patent
Jazi et al.

(10) Patent No.: US 10,964,314 B2
(45) Date of Patent: Mar. 30, 2021

(54) SYSTEM AND METHOD FOR OPTIMIZED NOISE REDUCTION IN THE PRESENCE OF SPEECH DISTORTION USING ADAPTIVE MICROPHONE ARRAY

(71) Applicant: Cirrus Logic International Semiconductor Ltd., Edinburgh (GB)

(72) Inventors: Nima Yousefian Jazi, Tempe, AZ (US); Justin L. Allen, Mesa, AZ (US)

(73) Assignee: Cirrus Logic, Inc., Austin, TX (US)

( * ) Notice: Subject to any disclaimer, the term of this patent is extended or adjusted under 35 U.S.C. 154(b) by 229 days.

(21) Appl. No.: 16/361,430

(22) Filed: Mar. 22, 2019

(65) Prior Publication Data
US 2020/0302922 A1 Sep. 24, 2020

(51) Int. Cl.
*G10L 21/0216* (2013.01)
*G10L 15/20* (2006.01)
(Continued)

(52) U.S. Cl.
CPC .............. *G10L 15/20* (2013.01); *G10L 15/22* (2013.01); *G10L 21/0232* (2013.01);
(Continued)

(58) Field of Classification Search
CPC ....... G10L 2021/02165; G10L 21/0208; G10L 21/0216; G10L 21/0224; G10L 21/0232
See application file for complete search history.

(56) References Cited

U.S. PATENT DOCUMENTS

| 8,473,285 B2 * | 6/2013 | Every | G10L 21/0208 704/226 |
| 8,744,844 B2 * | 6/2014 | Klein | H04R 3/002 704/226 |

(Continued)

FOREIGN PATENT DOCUMENTS

EP 1652404 B1 * 11/2010 ............ H04R 3/005

OTHER PUBLICATIONS

N. Yousefian, et al. "A Dual-Microphone Speech Enhancement Algorithm Based on the Coherence Function," IEEE Trans. Audio, Speech and Language Processing, Feb. 2012. (Year: 2012).*

(Continued)

*Primary Examiner* — Feng-Tzer Tzeng
(74) *Attorney, Agent, or Firm* — E. Alan Davis; James W. Huffman

(57) ABSTRACT

An adaptive beamformer includes at least first and second microphones that generate respective audio signals that include speech and noise, a controller that detects occurrences of speech and noise within the audio signals, an adaptive speech cancelling filter that cancels speech from the audio signal of the second microphone to provide a speech-cancelled signal, an adaptive mixing block that combines the speech-cancelled signal and the second microphone audio signal to provide a noise reference signal in a weighted manner such that a weight of the second microphone signal is increased proportionally with an amount of the detected noise and a weight of the speech-cancelled signal is increased proportionally with an amount of the (Continued)

detected speech, and an adaptive noise cancelling filter that uses the noise reference signal to remove the noise from the first microphone audio signal.

20 Claims, 5 Drawing Sheets

(51) Int. Cl.
    *G10L 15/22*     (2006.01)
    *H04R 3/00*     (2006.01)
    *G10L 21/0232*     (2013.01)
    *H04R 1/40*     (2006.01)
    *G10L 25/84*     (2013.01)
    *G10L 21/0224*     (2013.01)

(52) U.S. Cl.
    CPC .............. *G10L 25/84* (2013.01); *H04R 1/406* (2013.01); *H04R 3/005* (2013.01); *G10L 21/0216* (2013.01); *G10L 21/0224* (2013.01); *G10L 2021/02165* (2013.01)

(56) References Cited

U.S. PATENT DOCUMENTS 9,438,992 B2 * 9/2016 Every ................. G10L 21/0208
2013/0054231 A1 * 2/2013 Jeub ....................... G10L 19/03
                                                            704/226

OTHER PUBLICATIONS

Zhang, Xianxian et al. "CSA-BF: A Constrained Switched Adaptive Beamformer for Speech Enhancement and Recognition in Real Car Environments." *IEEE Transactions on Speech and Audio Processing.* vol. 11, No. 6. Nov. 2003. pp. 733-745.

* cited by examiner

SYSTEM AND METHOD FOR OPTIMIZED NOISE REDUCTION IN THE PRESENCE OF SPEECH DISTORTION USING ADAPTIVE MICROPHONE ARRAY

BACKGROUND

Traditionally, audio devices were used to facilitate speech communications, e.g., telephone voice calls. The primary consideration, or paradigm, in the design of audio devices for speech communications has long been to reproduce the speech from the talker to the listener with high fidelity, e.g., with minimal speech distortion. Often voice calls are made in noisy environments, sometimes in diverse and harsh acoustic conditions such as automobiles, airports, restaurants, etc. Examples of noise include road noise, babble, engine noise, competing talkers, mechanical devices (e.g., washing machines, dishwashers), and speeding vehicle noise. Noise cancellation was developed to reduce the noise in speech communications. In particular, noise cancellation has been largely facilitated by the presence of multiple microphones (a microphone array) in audio devices. Microphone array processing (e.g., beamforming) can reduce noise while preserving speech to make voice calling clearer. Minimization of speech distortion has remained the paradigm in the development of noise cancellation systems. Thus, conventional microphone array processing has been optimized to minimize speech distortion at the expense of noise reduction. That is, conventional beamformers cancel as much noise as possible without distorting speech, which is the goal in the voice calling scenario.

Today, a significant amount of audio processing is performed for the purpose of Automatic Speech Recognition (ASR) in which an artificial listener, rather than a human, is parsing the received audio signal. Noisy environments may also cause difficulty for ASR, and the paradigm of reducing as much noise as possible without minimizing speech distortion has also improved ASR accuracy relative to the absence of noise reduction. However, the present inventors have discovered that a different paradigm of prioritizing noise reduction at the expense of some speech distortion may improve the accuracy of ASR in some cases.

SUMMARY

The present inventors have discovered that some ASR engines may perform better with more noise reduction and some speech distortion, particularly in low input signal-to-noise ratio (SNR) scenarios. Embodiments are described that allow a trade-off between noise reduction and speech distortion to maximize the performance of a given ASR engine. Embodiments also optimize the trade-off in real time between noise reduction and speech distortion during voice calls. Depending on the amount of noise present in the voice call, the beamformer is optimized for voice quality. This optimization is in contrast to conventional solutions that assume no speech distortion is desirable in all operating conditions and scenarios.

In one embodiment, the present disclosure provides an adaptive beamformer that includes at least first and second microphones that generate respective audio signals that include speech and noise, a controller that detects occurrences of speech and noise within the audio signals, an adaptive speech cancelling filter that cancels speech from the audio signal of the second microphone to provide a speech-cancelled signal, and an adaptive mixing block that combines the speech-cancelled signal and the second microphone audio signal to provide a noise reference signal. The adaptive mixing block combines the speech-cancelled signal and the second microphone audio signal in a weighted manner such that a weight of the second microphone signal is increased proportionally with an amount of the detected noise and a weight of the speech-cancelled signal is increased proportionally with an amount of the detected speech. The adaptive beamformer also includes an adaptive noise cancelling filter that uses the noise reference signal to remove the noise from the first microphone audio signal.

In another embodiment, the present disclosure provides a method for adaptive beamforming using at least first and second microphones that generate respective audio signals that include speech and noise. The method includes detecting occurrences of speech and noise within the audio signals. The method also includes cancelling, using an adaptive speech cancelling filter, speech from the audio signal of the second microphone to provide a speech-cancelled signal. The method also includes combining the speech-cancelled signal and the second microphone audio signal to provide a noise reference signal in a weighted manner such that a weight of the second microphone signal is increased proportionally with an amount of the detected noise and a weight of the speech-cancelled signal is increased proportionally with an amount of the detected speech. The method also includes removing, using an adaptive noise cancelling filter, the noise from the first microphone audio signal using the noise reference signal.

In yet another embodiment, the present disclosure provides a non-transitory computer-readable medium having instructions stored thereon that are capable of causing or configuring an adaptive beamformer having at least first and second microphones that generate respective audio signals that include speech and noise to perform operations that include detecting occurrences of speech and noise within the audio signals. The operations also include cancelling, using an adaptive speech cancelling filter, speech from the audio signal of the second microphone to provide a speech-cancelled signal. The operations also include combining the speech-cancelled signal and the second microphone audio signal to provide a noise reference signal in a weighted manner such that a weight of the second microphone signal is increased proportionally with an amount of the detected noise and a weight of the speech-cancelled signal is increased proportionally with an amount of the detected speech. The operations also include removing, using an adaptive noise cancelling filter, the noise from the first microphone audio signal using the noise reference signal.

DETAILED DESCRIPTION

Figure 1:
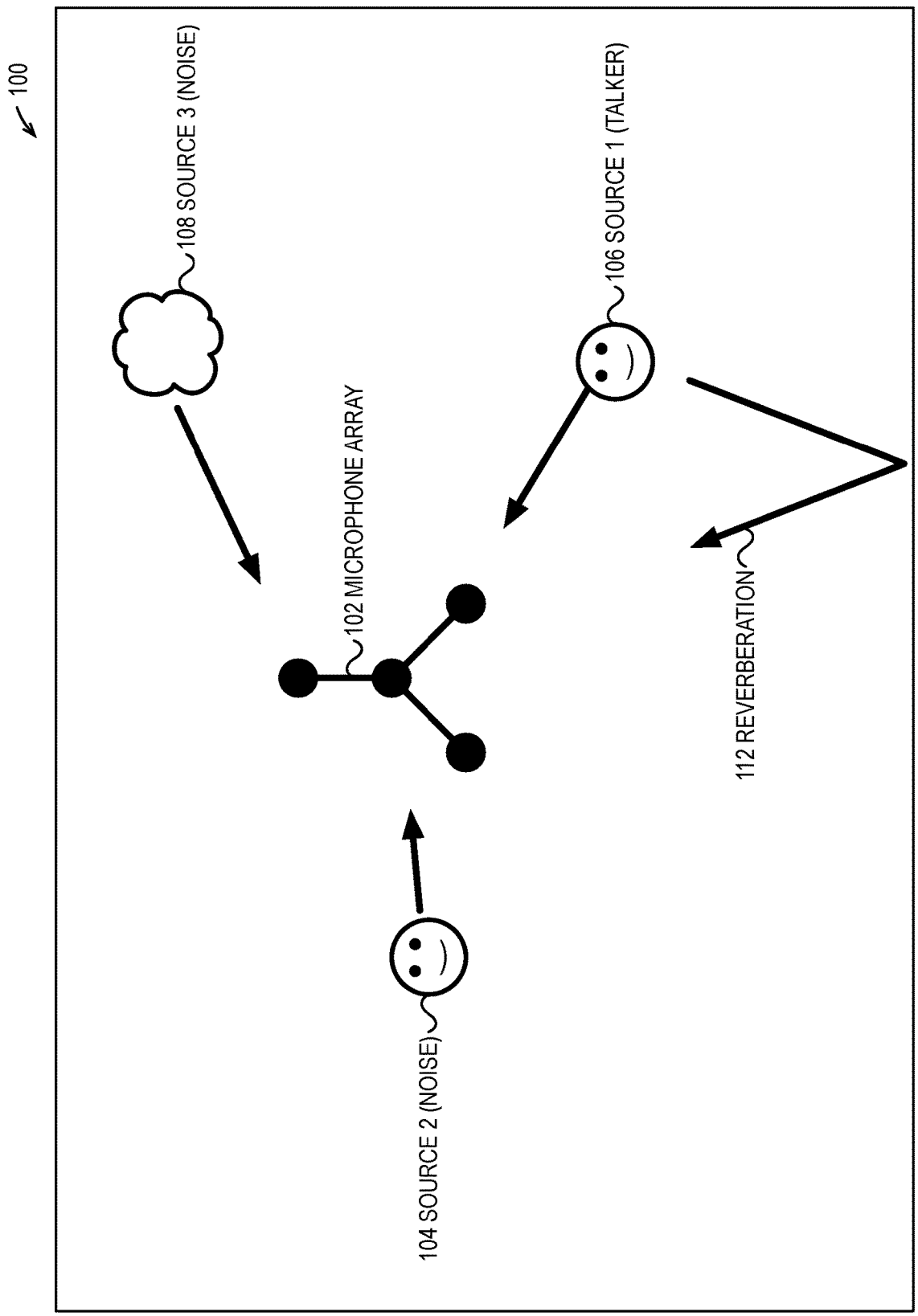
FIG. 1 is an example diagram illustrating an environment in which microphone array processing may be employed in accordance with embodiments of the present disclosure.

Referring now to FIG. 1, a diagram illustrating an environment 100 in which microphone array processing may be employed in accordance with embodiments of the present disclosure is shown. A microphone array 102 is shown that comprises a plurality of microphones. The microphone array 102 may be included in an audio device, e.g., mobile phone, headphone, personal voice assistant system, that may be used to perform ASR as well as voice communication. The microphone array 102 may receive audio from multiple sources, e.g., a source 1 106 that may be a talker (e.g., a human speaking who initiated a voice call or who is wanting the audio device to perform ASR on his speech), a source 2 104 that may be a noise source (e.g., a television or radio or other human who is not the initiator of the voice call or human that the source 1 106 talker does not desire the audio device to perform ASR on the speech of the source 2 104 noise), and a source 3 108 that may be an additional noise source (e.g., road noise, babble, engine noise, competing talkers, mechanical devices (e.g., washing machines, dishwashers), and speeding vehicle noise). In the example environment of FIG. 1, reverberation 112 of the audio from one or more of the sources 104/106/108 may occur, and the audio reverberation 112 may also be received by the microphone array 102. Although an example is given in FIG. 1 with three audio sources, the described embodiments of systems and methods may optimize noise reduction and speech distortion using an adaptive microphone array in the presence of different numbers of talkers and noise sources.

Figure 2:
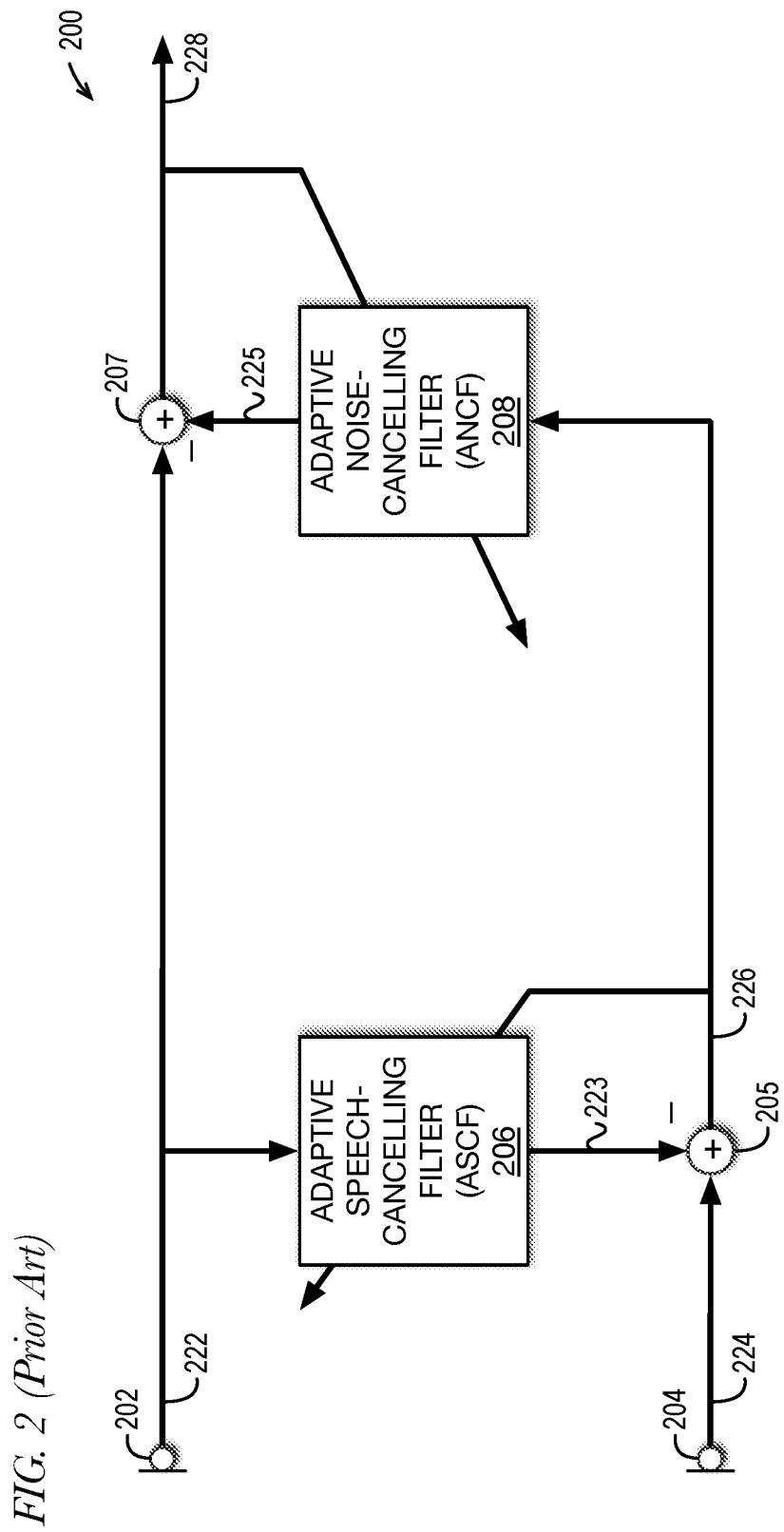
FIG. 2 is an example block diagram of a conventional microphone array processing system.

Referring now to FIG. 2, a block diagram of a conventional microphone array processing system 200 is shown. The system 200 includes a first microphone 202, a second microphone 204, an adaptive speech-cancelling filter (ASCF) 206, an adaptive noise-cancelling filter (ANCF) 208, a first summing element 205, and a second summing element 207. The first microphone 202 generates a first audio signal 222, and the second microphone 204 generates a second audio signal 224 in response to received audio, e.g., generated by the three sources 104/106/108 (and reverberation 112) of FIG. 1. The first and second microphone audio signals 222/224 may include both speech and noise. The conventional system 200 may be referred to as a generalized side lobe canceller (GSC) and performs Minimum Variance Distortionless Response (MVDR) microphone array processing, which were developed for a human listener, rather than a machine listener that performs ASR, and were optimized to avoid speech distortion at the expense of noise reduction.

The adaptive speech cancelling filter 206 receives the first microphone audio signal 222 and adaptively extracts the speech therefrom to generate a speech signal 223 that is provided to summing element 205. Summing element 205 subtracts the speech signal 223 from the second microphone audio signal 224 to generate a speech-cancelled signal 226 that ideally includes only noise and no speech. The adaptive speech cancelling filter 206 receives the speech-cancelled signal 226 as feedback and uses the feedback to operate in an adaptive manner over time to improve speech cancellation in the speech-cancelled signal 226.

The adaptive noise-cancelling filter 208 receives and adaptively reshapes the speech-cancelled signal 226 to generate a noise signal 225 that is provided to summing element 207. Summing element 207 subtracts the noise signal 225 from the first microphone audio signal 222 to generate an output signal 228 that ideally includes only speech and no noise. The adaptive noise-cancelling filter 208 receives the output signal 228 as feedback and uses the feedback to operate in an adaptive manner over time to improve noise cancellation in the output signal 228. However, as described above, the present inventors have advantageously discovered that ASR engines may be more accurate if noise reduction is optimized at the expense of speech distortion.

Figure 3:
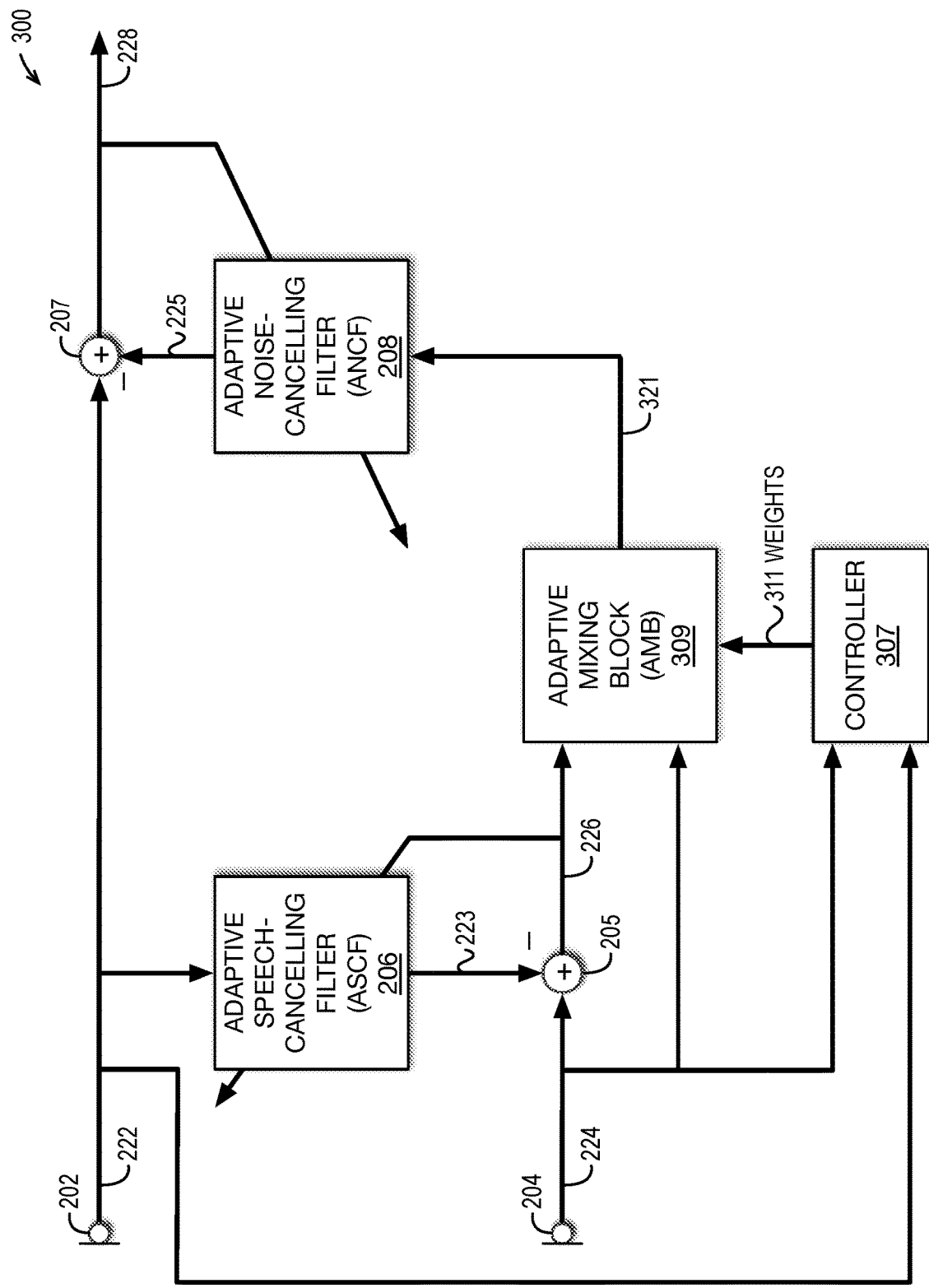
FIG. 3 is an example block diagram illustrating a microphone array processing system in accordance with embodiments of the present disclosure.

Referring now to FIG. 3, a block diagram illustrating a microphone array processing system 300 in accordance with embodiments of the present disclosure is shown. The system 300 of FIG. 3 is similar in some respects to the system 200 of FIG. 2 and includes first microphone 202 that generates audio signal 222, second microphone 204 that generates audio signal 224, the adaptive speech-cancelling filter 206, the adaptive noise-cancelling filter 208, summing element 205 that generates the speech-cancelled signal 226, and summing element 207 that generates the output signal 228. Although in the embodiment of FIG. 3, the number of microphones in the array is two, other embodiments are contemplated with a larger number of microphones, e.g., four.

However, system 300 also includes an adaptive mixing block 309 and a controller 307. Controller 307 receives first microphone audio signal 222 and second microphone audio signal 224 (in addition to other inputs described with respect to FIG. 4) which controller 307 uses to detect occurrences of speech and noise within audio signals 222/224 and to generate one or more weights 311 provided to adaptive mixing block 309. Adaptive mixing block 309 receives the speech-cancelled signal 226 and the second microphone audio signal 224 and mixes them in a weighted manner using the weights 311 provided by controller 307 to generate a noise reference signal 321. Preferably, the adaptive speech cancelling filter 206 is adaptively updated based on the speech-cancelled signal 226 regardless of the manner in which the speech-cancelled signal 226 and the second microphone audio signal 224 are mixed.

Whereas in system 200 of FIG. 2, adaptive noise-cancelling filter 208 receives and uses the speech-cancelled signal 226, in system 300, adaptive noise-cancelling filter 208 receives and uses the noise reference signal 321, which is a weighted mix of the speech-cancelled signal 226 and the second microphone audio signal 224. In one embodiment, the weights 311 vary in the range [0,1] (i.e., between zero and one inclusively) depending upon the operating conditions and scenarios and/or operating history. In some operating conditions and scenarios, the weight for the second microphone audio signal 224 is non-zero such that the noise reference signal 321 may include some desired speech. Consequently, some of the desired speech may also be present in noise signal 225, which may cause some of the desired speech to be removed from the first microphone audio signal 222 resulting in distortion of the desired speech in the output signal 228. However, the result may also be the removal of additional noise that would not be removed by a conventional system, e.g., system 200 of FIG. 2. The removal of the additional noise, at the expense of increased speech distortion, may improve ASR, e.g., in low input SNR conditions.

In one embodiment, the beamformer of system 300 comprises an adaptive blocking matrix (ABM) portion followed by a side-lobe canceller (SLC). The ABM reduces speech distortion. The SLC reduces noise. It has been observed that the SLC is able to cancel more noise if the ABM is not fully adapted. In one embodiment, the amount of ABM adaptation is controlled in different scenarios to allow more SLC noise reduction. The ABM adaptation and SLC noise reduction trade-off may be optimized for different scenarios, e.g., ASR versus voice calling. System 300 may be referred to as a modified GSC microphone array processing system.

Figure 4:
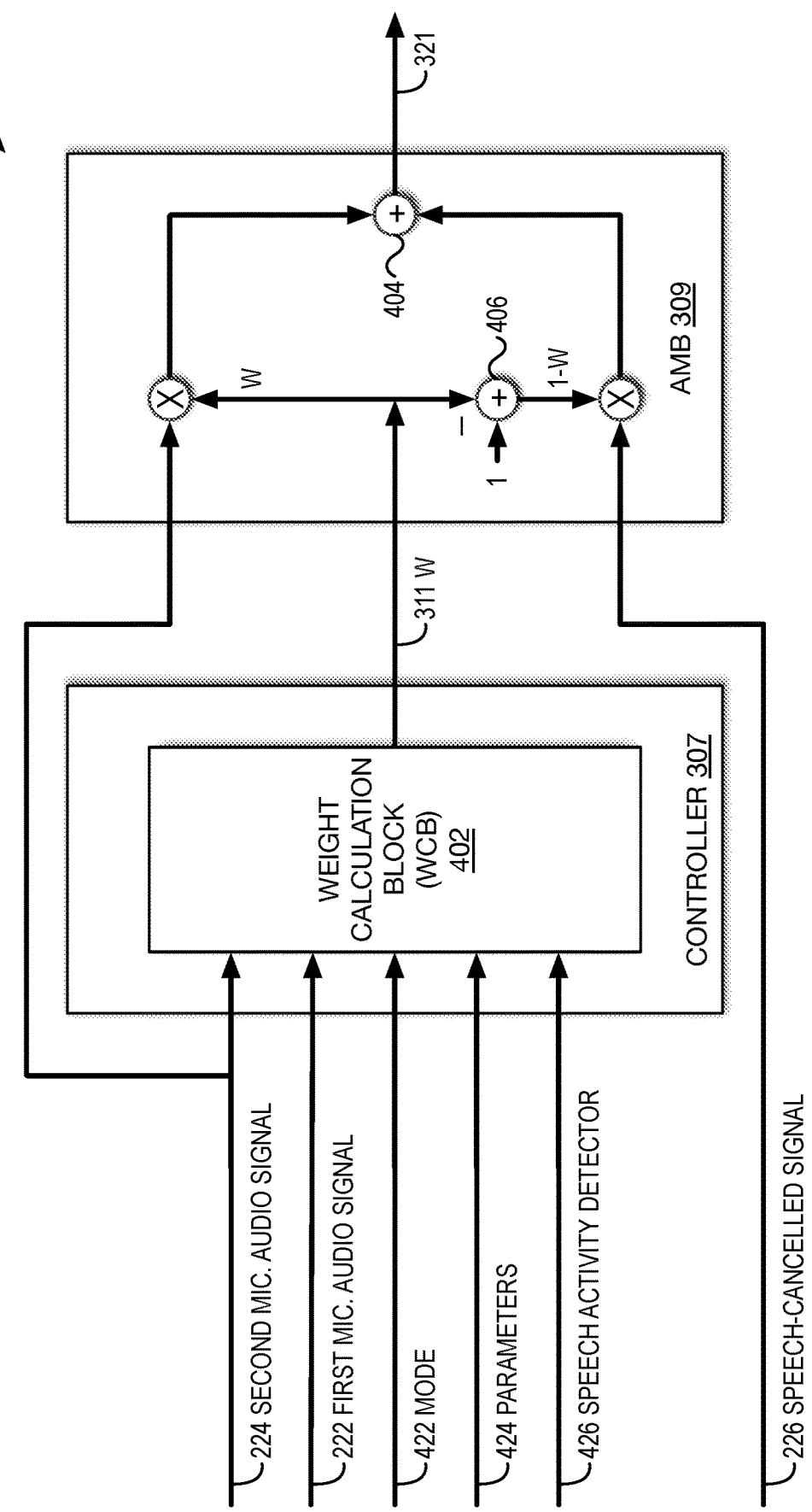
FIG. 4 is an example block diagram illustrating in more detail the controller and adaptive mixing block of FIG. 3 in accordance with embodiments of the present disclosure.

Referring now to FIG. 4, a block diagram illustrating in more detail the controller 307 and adaptive mixing block 309 of FIG. 3 in accordance with embodiments of the present disclosure is shown. Controller 307 includes a weight calculation block (WCB) 402 that generates, in response to inputs, a weight W 311 that is provided to the adaptive mixing block 309 of FIG. 3. In the embodiment of FIG. 4, weight W 311 is a value less than or equal to one, although other embodiments are contemplated. The adaptive mixing block 309 multiplies the second microphone audio signal 224 by weight W 311 and provides the product to a summing element 404. A second summing element 406 subtracts weight W 311 from the value one, which difference is multiplied by the speech-cancelled signal 226, which product is also provided to summing element 404. The output of summing element 404 is noise reference signal 321 of FIG. 3. Thus, as the value of weight W 311 increases, the greater the amount of the second microphone audio signal 224 is included in the noise reference signal 321, which may facilitate greater noise reduction.

The weight calculation block 402 may dynamically generate a new value of weight W 311 for each time frame. The weight calculation block 402 receives first microphone audio signal 222 and second microphone audio signal 224. The weight calculation block 402 also receives a mode input 422 that indicates whether or not the system 300 is operating in ASR mode. The system 300 is operating in ASR mode when it is attempting to recognize speech in the audio signal for conversion to text, e.g., as performed by smartphones or personal voice assistants. Various objective speech recognition indices may be used to evaluate ASR accuracy, e.g., word error rate (WER), word accuracy (WACC). In contrast, the system 300 is operating in voice mode when it is being used for far-end communication, e.g., a telephone call, voice-over-IP (VoIP) conversation, etc. Subjective evaluation of far-end communication quality may be employed.

The weight calculation block 402 also receives the output of a speech activity detector 426. In one embodiment, the output of the speech activity detector 426 comprises an array of values indexed by frequency band ranging from a direct current (DC) band to the number of coefficients of a Fast Fourier Transform (FFT) performed by the system 300 in which each entry of the array has a value of negative one to indicate detection of noise in the frame, a value of positive one to indicate detection of speech in the frame, and a value of zero to indicate detection of neither noise nor speech. The weight calculation block 402 also receives parameters 424. The parameters 424 may include flags, thresholds and constants used to dynamically update weight W 311, which are discussed in more detail with respect to FIG. 5. In one embodiment, one or more of the flags, thresholds and constants are run-time programmable and/or compile-time programmable. In one embodiment, the weight calculation block 402 maintains state used to dynamically update weight W 311, e.g., a number of frames since speech was last detected and a number of frames since noise was last detected.

Preferably, weight W 311 is adaptively updated over time in a smoothed fashion, which may avoid large changes in noise reference signal 321, which may avoid generation of an output signal 228 that produces discernable audio artifacts. Although embodiments have been described in which the number of microphones in the array is two, other embodiments are contemplated with a larger number of microphones, e.g., four. Furthermore, different numbers of microphone audio signals may be mixed to generate the noise reference signal, and each of the signals mixed may have its own weight. In one embodiment, the weights are complements of one another, e.g., they sum to one.

Figure 5:
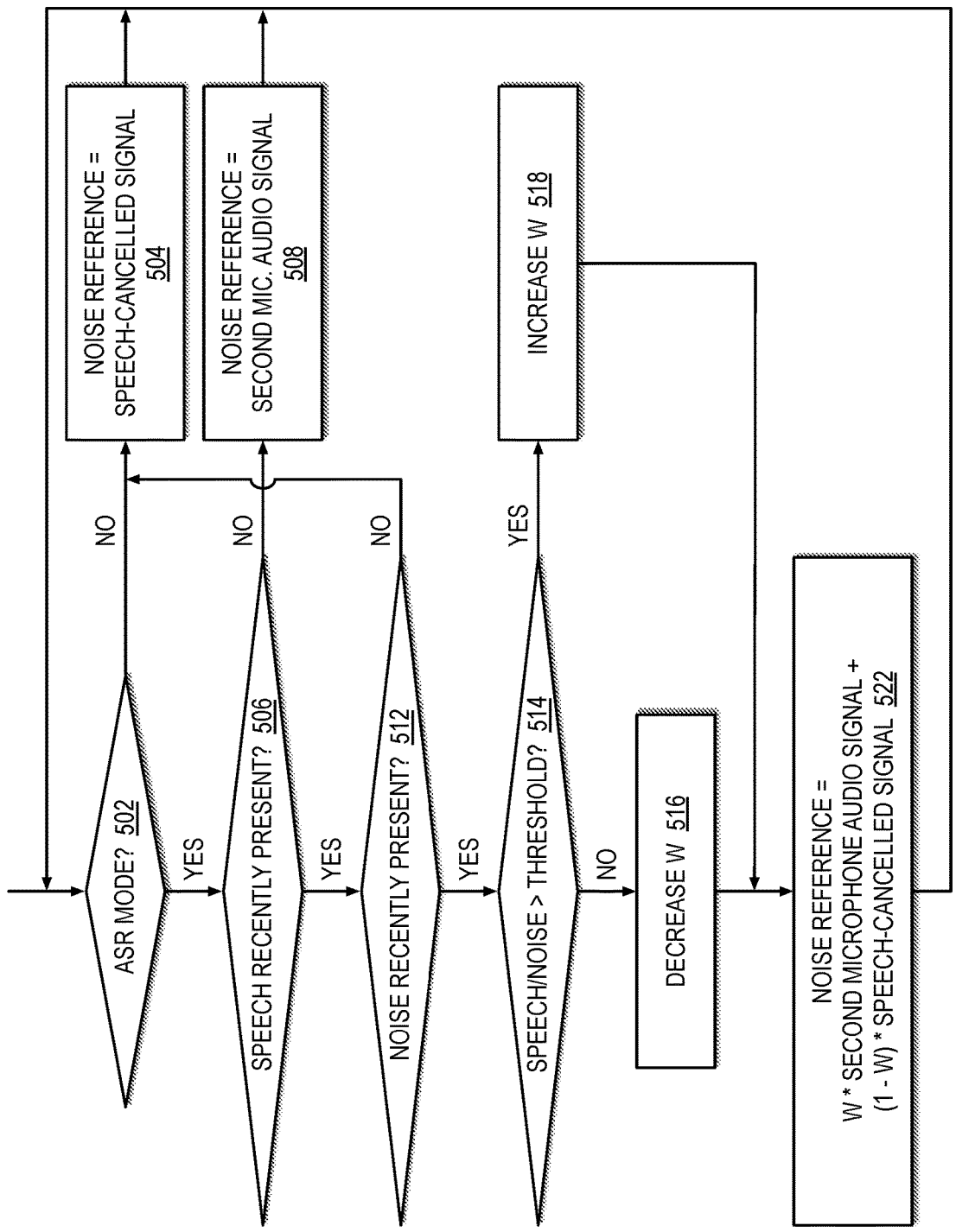
FIG. 5 is an example flow diagram illustrating operation of the system of FIG. 3 in accordance with embodiments of the present disclosure.

Referring now to FIG. 5, a flow diagram illustrating operation of the system 300 of FIG. 3 in accordance with embodiments of the present disclosure is shown. Operation begins at decision block 502.

At decision block 502, controller 307 of FIG. 3 determines whether the system 300 is operating in ASR mode (e.g., by examining the mode input 422 of FIG. 3). If so, operation proceeds to decision block 506; otherwise, operation proceeds to block 504. In an alternate embodiment, decision block 502 is not present, i.e., the system 300 updates the weights and mixes the speech-cancelled signal 226 and second microphone audio signal 224 even when operating in voice mode.

At block 504, controller 307 selects the speech-cancelled signal 226 as the noise reference signal 321 (e.g., by the weight calculation block 402 outputting a zero value of weight W 311). Operation returns to decision block 502 to process the next frame.

At decision block 506, controller 307 determines whether speech has been recently present in the first/second microphone audio signals 222/224. If so, operation proceeds to decision block 512; otherwise, operation proceeds to block 508. In one embodiment, controller 307 maintains a count of a number of frames since speech was detected and determines whether the count has exceeded a threshold.

At block 508, controller 307 selects the second microphone audio signal 224 as the noise reference signal 321 (e.g., by the weight calculation block 402 outputting a one value of weight W 311). Operation returns to decision block 502 to process the next frame.

At decision block 512, controller 307 determines whether noise has been recently present in the first/second microphone audio signals 222/224. If so, operation proceeds to decision block 514; otherwise, operation proceeds to block 504. In one embodiment, controller 307 maintains a count of a number of frames since noise was detected and determines whether the count has exceeded a threshold.

At decision block 514, controller 307 determines whether a ratio of speech to noise in the first/second microphone audio signals 222/224 of the current frame exceeds a threshold. If so, operation proceeds to block 516; otherwise, operation proceeds to block 518. In one embodiment, controller 307 determines whether a sum of the entries of the output of the speech activity detector 426 has exceeded a threshold.

At block 516, controller 307 decreases weight W 311. In one embodiment, controller 307 decreases weight W 311 using a first set of parameters when the system 300 is operating in an ASR mode and otherwise decreases weight W 311 using a second set of parameters. Operation proceeds to block 522.

At block 518, controller 307 increases weight W 311. In one embodiment, controller 307 increases weight W 311 using a first set of parameters when the system 300 is operating in an ASR mode and otherwise increases weight W 311 using a second set of parameters. Operation proceeds to block 522.

At block 522, controller 307 computes noise reference signal 321 as a sum of the product of weight W 311 and second microphone audio signal 224 and the product of speech-cancelled signal 226 and the sum of one minus weight W 311. Operation returns to decision block 502 to process the next frame.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. An adaptive beamformer, comprising:
   at least first and second microphones that generate respective audio signals that include speech and noise;
   a controller that detects occurrences of speech and noise within the audio signals;
   an adaptive speech cancelling filter that cancels speech from the audio signal of the second microphone to provide a speech-cancelled signal;
   an adaptive mixing block that combines the speech-cancelled signal and the second microphone audio signal to provide a noise reference signal;
   wherein the adaptive mixing block combines the speech-cancelled signal and the second microphone audio signal in a weighted manner such that a weight of the second microphone signal is increased proportionally with an amount of the detected noise and a weight of the speech-cancelled signal is increased proportionally with an amount of the detected speech; and
   an adaptive noise cancelling filter that uses the noise reference signal to remove the noise from the first microphone audio signal.

2. The adaptive beamformer of claim 1,
   wherein the weights are complements of one another.

3. The adaptive beamformer of claim 1,
   wherein the weight of the second microphone signal is decreased relative to the weight of the speech-cancelled signal when a ratio of the amount of detected speech to the amount of detected noise is greater than a threshold.

4. The adaptive beamformer of claim 3,
   wherein the weight of the second microphone signal is increased relative to the weight of the speech-cancelled signal when the ratio is less than the threshold.

5. The adaptive beamformer of claim 3,
   wherein the threshold is different depending upon whether or not the adaptive beamformer is operating in an automatic speech recognition mode.

6. The adaptive beamformer of claim 1,
   wherein the weight of the second microphone signal is zero when noise is absent greater than a threshold time.

7. The adaptive beamformer of claim 1,
   wherein the weight of the speech-cancelled signal is zero when speech is absent greater than a threshold time.

8. The adaptive beamformer of claim 1,
   wherein the weight of the second microphone signal is zero when the adaptive beamformer is not operating in an automatic speech recognition mode.

9. The adaptive beamformer of claim 1,
   wherein the weights are dynamically smoothed differently depending upon whether or not the adaptive beamformer is operating in an automatic speech recognition mode.

10. A method for adaptive beamforming using at least first and second microphones that generate respective audio signals that include speech and noise, comprising:
    detecting occurrences of speech and noise within the audio signals;
    cancelling, using an adaptive speech cancelling filter, speech from the audio signal of the second microphone to provide a speech-cancelled signal;
    combining the speech-cancelled signal and the second microphone audio signal to provide a noise reference signal in a weighted manner such that a weight of the second microphone signal is increased proportionally with an amount of the detected noise and a weight of the speech-cancelled signal is increased proportionally with an amount of the detected speech; and
    removing, using an adaptive noise cancelling filter, the noise from the first microphone audio signal using the noise reference signal.

11. The method of claim 10,
    wherein the weights are complements of one another.

12. The method of claim 10,
    wherein the weight of the second microphone signal is decreased relative to the weight of the speech-cancelled signal when a ratio of the amount of detected speech to the amount of detected noise is greater than a threshold.

13. The method of claim 12,
    wherein the weight of the second microphone signal is increased relative to the weight of the speech-cancelled signal when the ratio is less than the threshold.

14. The method of claim 12,
    wherein the threshold is different depending upon whether or not the adaptive beamformer is operating in an automatic speech recognition mode.

15. The method of claim 10,
    wherein the weight of the second microphone signal is zero when noise is absent greater than a threshold time.

16. The method of claim 10,
    wherein the weight of the speech-cancelled signal is zero when speech is absent greater than a threshold time.

17. The method of claim 10,
wherein the weight of the second microphone signal is zero when the adaptive beamformer is not operating in an automatic speech recognition mode.

18. The method of claim 10,
wherein the weights are dynamically smoothed differently depending upon whether or not the adaptive beamformer is operating in an automatic speech recognition mode.

19. A non-transitory computer-readable medium having instructions stored thereon that are capable of causing or configuring an adaptive beamformer having at least first and second microphones that generate respective audio signals that include speech and noise to perform operations comprising:
  detecting occurrences of speech and noise within the audio signals;
  cancelling, using an adaptive speech cancelling filter, speech from the audio signal of the second microphone to provide a speech-cancelled signal;
  combining the speech-cancelled signal and the second microphone audio signal to provide a noise reference signal in a weighted manner such that a weight of the second microphone signal is increased proportionally with an amount of the detected noise and a weight of the speech-cancelled signal is increased proportionally with an amount of the detected speech; and
  removing, using an adaptive noise cancelling filter, the noise from the first microphone audio signal using the noise reference signal.

20. The non-transitory computer-readable medium of claim 19,
wherein the weight of the second microphone signal is decreased relative to the weight of the speech-cancelled signal when a ratio of the amount of detected speech to the amount of detected noise is greater than a threshold.

\* \* \* \* \*